Patented June 22, 1937

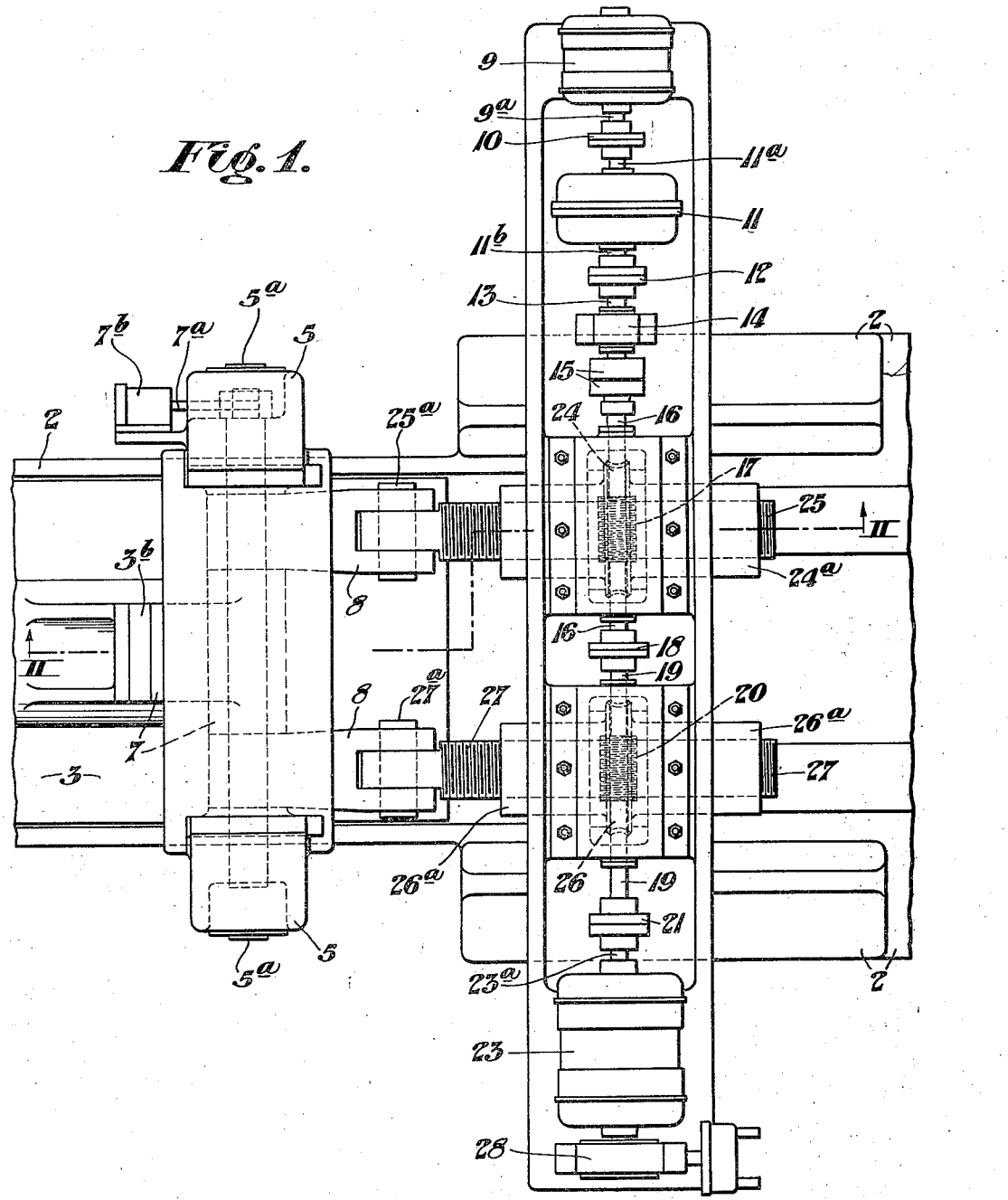

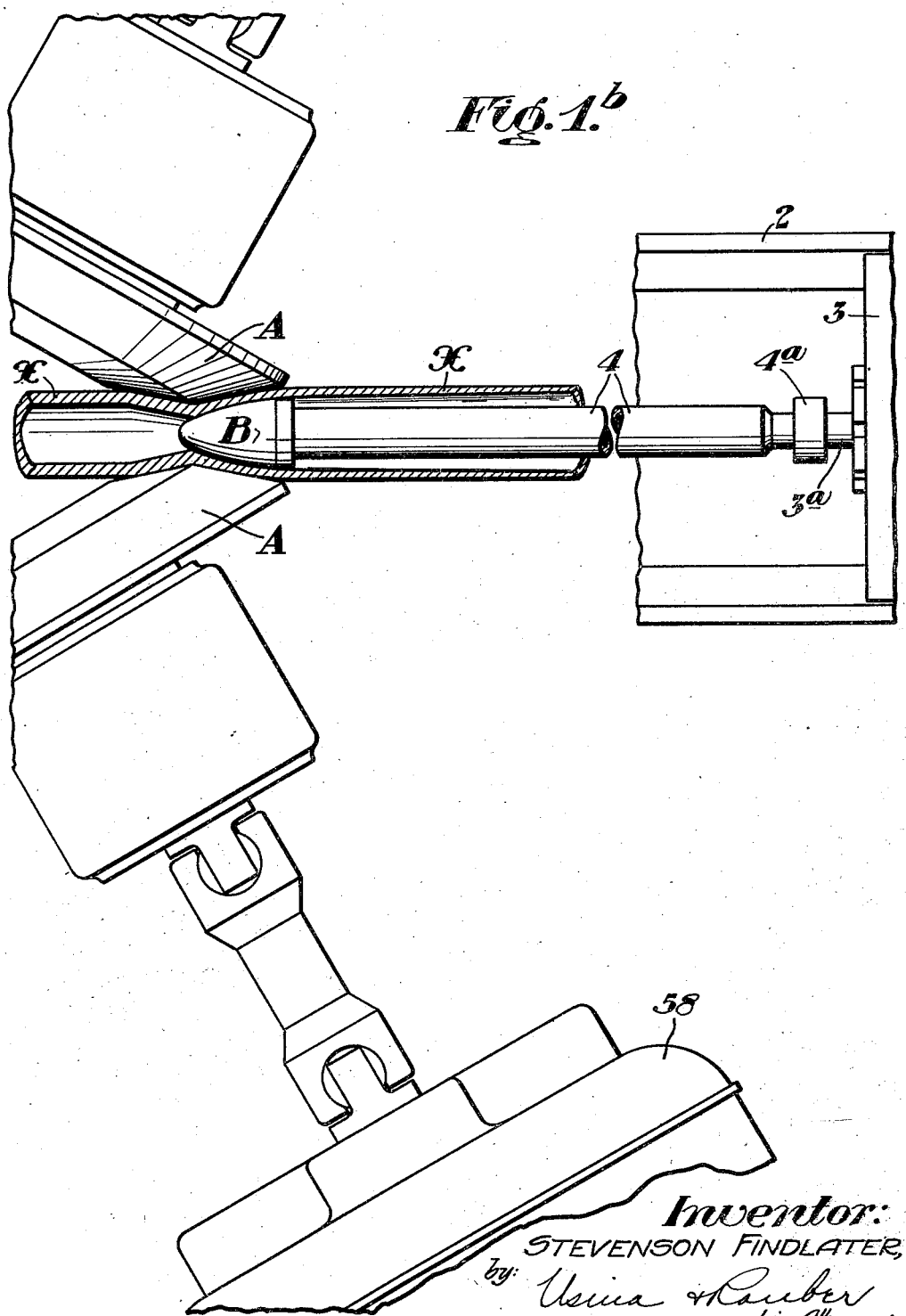

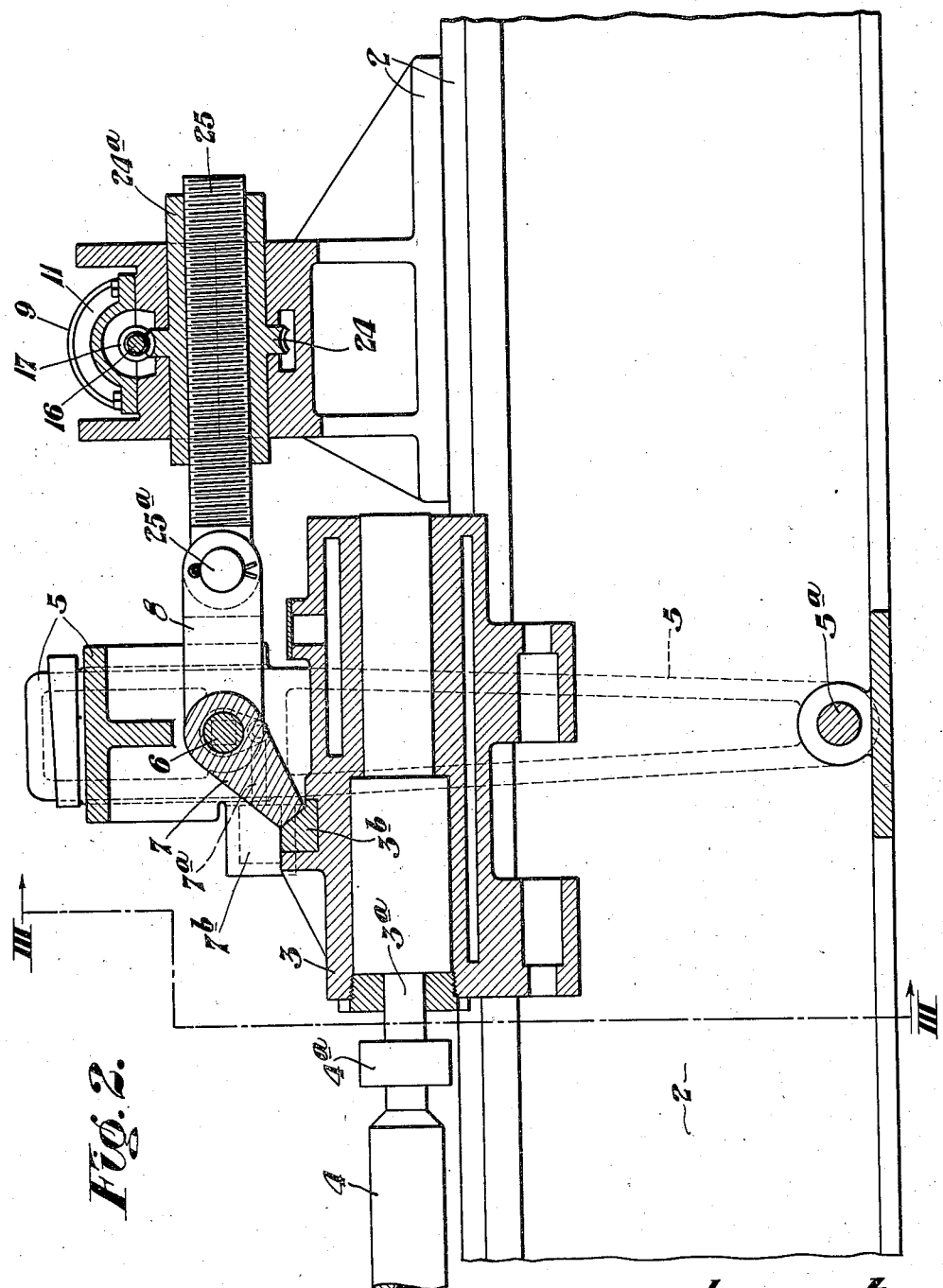

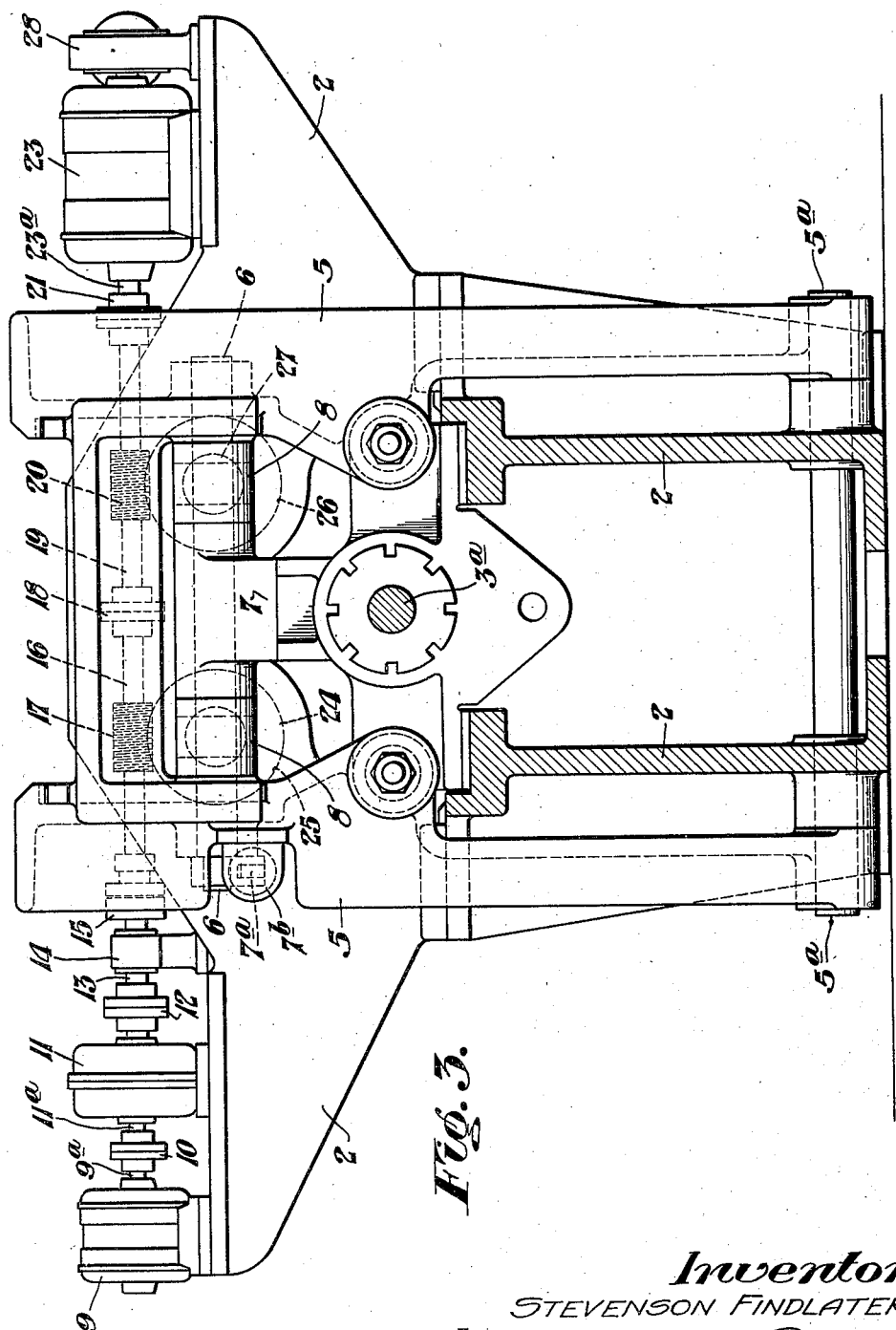

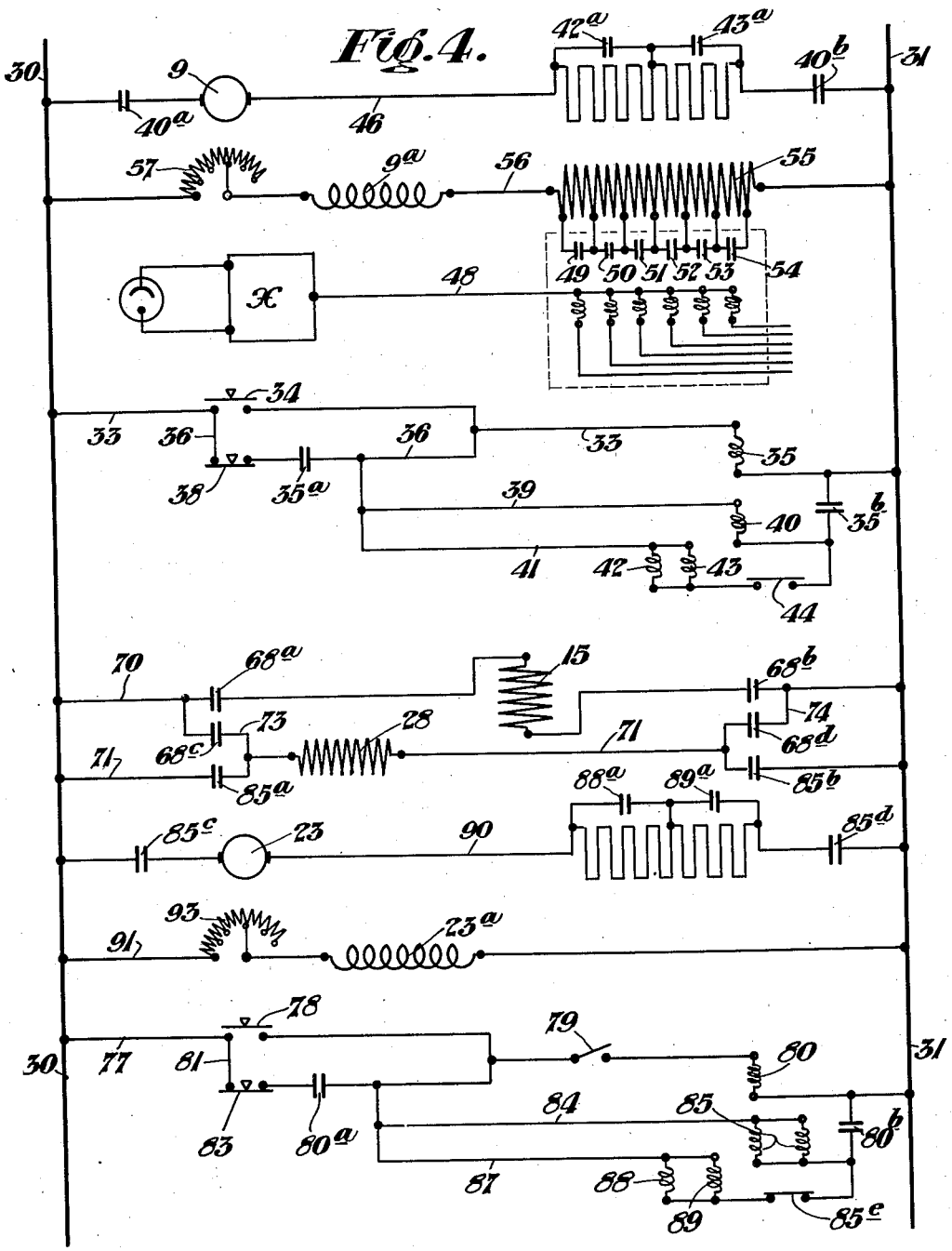

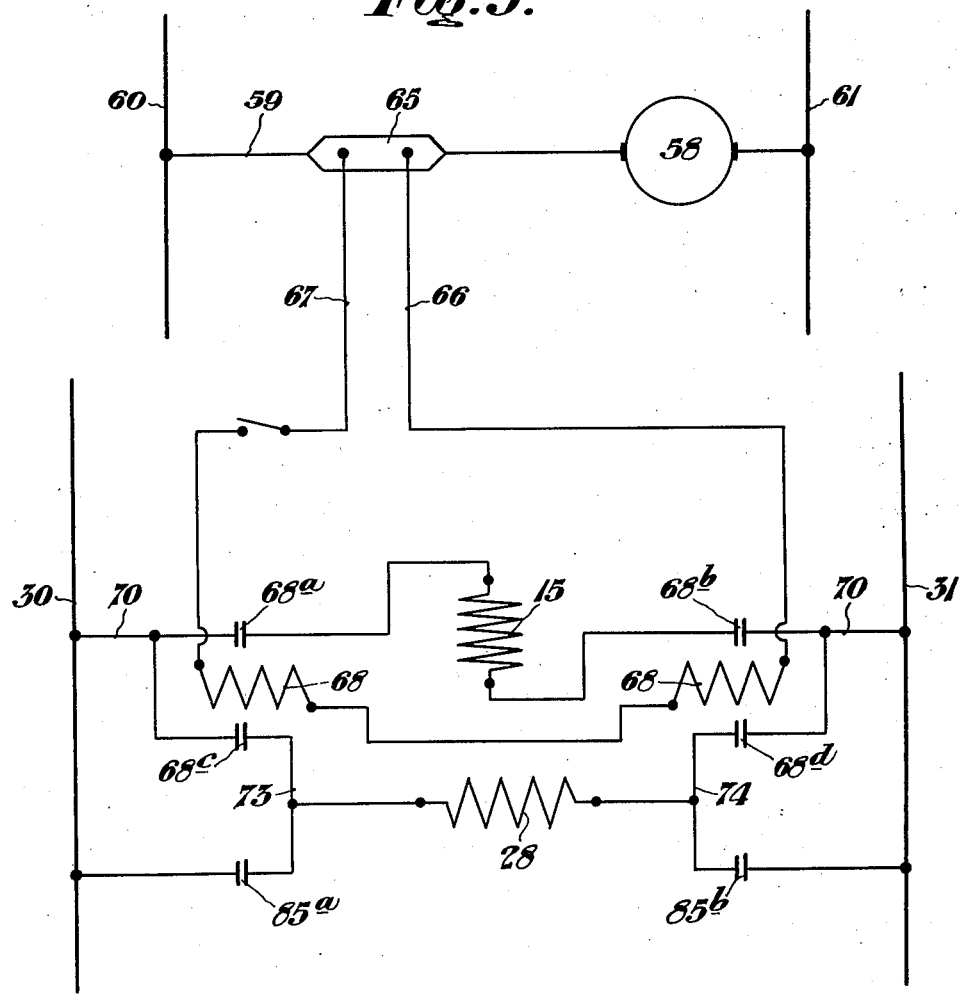

2,084,333

UNITED STATES PATENT OFFICE 2,084,333

APPARATUS FOR MAKING TAPERED TUBULAR WORKPIECES

Stevenson Findlater, McKeesport, Pa., assignor to National Tube Company, a corporation of New Jersey Application December 29, 1934, Serial No. 759,804

2 Claims. (Cl. 80—13)

This invention relates to apparatus for making tapered tubular work-pieces.

It is very desirable, under some circumstances, to obtain hollow articles having a tapering wall thickness; as, for example, in lamp posts, constructional sections of various types, and the like. Such articles are usually obtained by welding in such manner as to provide a constant change in their inner and outer diameters but none in the thickness of their walls.

In a co-pending application filed December 29, 1934, entitled Method and apparatus for making tapered work-pieces, and bearing Serial No. 759,803, I have disclosed a novel combination of elements which operate to provide a hollow article, or work-piece, whose internal diameter is substantially constant, but whose external diameter is varied with the result that its wall thickness is tapered. The work-piece thus obtained has many and varied uses, but it is often desirable to provide a work-piece having a tapered wall thickness but whose external diameter is substantially unvaried.

In a copending application entitled "Seamless pipe or tube mill" filed November 21, 1934, Serial No. 754,169, I have disclosed apparatus which is in many respects similar to that disclosed herein. This copending application is, however, concerned with compensations for changes in the size of the pass of a pipe or tube mill due to the expansive influence of the highly heated work-piece.

The temperature of a seamless pipe or tube mill is usually no higher at the end of a long period of operation than it was at the beginning. This is for the reason that the mill is started without cooling water on the rolls and heated billets passed therethrough until the rolls acquire a desired temperature. At this time the rolls are sprayed with water in order that the temperature will not rise greatly beyond that desired. In this manner the general temperature of the mill is maintained as desired, but as each highly heated billet, or work-piece, moves through it, the temperature of the rolls, mandrel and mandrel bar is temporarily raised. This temporary rise in temperature causes a correspondingly temporary expansion of these elements. The temporary expansion of the rolls and mandrel is slight, but that of the mandrel bar is very appreciable due to its substantial length. The effects of this expansion are overcome by the use of the invention disclosed in my co-pending application, Serial No. 754,169.

It is one of the objects of the present invention to provide a novel apparatus for making tubular tapered work-pieces by the use of which the external diameter of the work-piece is maintained substantially unchanged, while the internal diameter thereof is varied to provide the taper.

Another object is the provision of a novel apparatus of the class described which may be inexpensively and conveniently applied to existing types of pipe and tube mills and one which operates automatically, due provision being made for temperature variations in the work-piece.

The foregoing and further objects will be apparent after referring to the drawings, in which:

Figures 1 and 1$^b$ are a plan of a part of the apparatus of the invention.

Figure 2 is a sectional view on the line II—II of Figure 1$^b$.

Figure 3 is a view on the line III—III of Figure 2.

Figures 4 and 5 are electrical circuits for operating the various elements of the invention.

Referring to Figure 1 of the drawings, there is disclosed a conventional seamless pipe or tube mill of the well known "Stiefel" type, comprising a pair of cone-shaped metal-working rolls A between which there is disposed a mandrel plug B. In this figure of the drawings one of the cone-shaped metal-working rolls A is shown as being motivated by a suitable electric motor 58, while its counterpart may be driven by a similar device or, if desired, from the same motor through suitable gearing. It is not believed necessary to illustrate either mode of operation of the second metal-working roll A, and such is therefore omitted for the sake of simplicity.

The numeral 2 designates a support for the apparatus of the invention. A mandrel bar carriage 3 is mounted on the support 2 for sliding movement therewith, in order to adjustably position a mandrel bar 4, and its associated mandrel plug B with respect to the rolls A of the mill. The end of the mandrel bar 4 is secured to the carriage 3 in any suitable manner as, for example, by a coupling 4$^a$ on the extension 3$^a$ of a thrust bearing located immediately at the rear thereof.

A support 5 is pivoted to the frame 2, as at 5$^a$, and provided with a horizontally disposed shaft 6 adjacent the upper surface of the mandrel bar carriage 3. A pair of links 8 is secured to the shaft 6 and is adapted, by suitable mechanism, to move the support 5 about the pivot 5$^a$. A motor 9 is secured to the frame 2 and provided with the usual motorshaft 9$^a$ and coupling 10, for connecting the same to the shaft 11$^a$ of a gear reduction mechanism generally indicated at 11. The gear reduction 11 is provided with another shaft 11b and a coupling 12 for connection to a shaft 13 which is journaled in a bearing 14. A magnetic clutch 15 is disposed adjacent the bearing 14 for clutching-in a shaft 16. A worm 17 is mounted on the shaft 16 for rotating a worm gear 24. The worm gear 24 is provided with a suitably journaled elongated sleeve portion 24a, on which it is mounted. The elongated sleeve portion 24a is internally screw-threaded for engagement with a screw 25, which is secured to one of the links 8 by a pin 25a. The other end of the shaft 16 is provided with a coupling 18 to which there is secured a shaft 19 on which there is mounted a worm 20. The shaft 19 is secured at its other end to the shaft 23a of a motor 23, by means of a coupling 21.

The worm 20 is adapted to cooperate with a worm gear 26 which is mounted on a suitably journaled elongated sleeve 26a. The elongated sleeve 26a is internally screw-threaded to receive a screw 27, which is secured to the free end of the other of the links 8 by a pin 27a.

A magnetic brake 28 is provided for the motor 23. A latch 7 is secured to the horizontal shaft 6 and is adapted to make contact on its outer end with a wear-plate 3b which is secured to the mandrel bar carriage 3.

The horizontal shaft 6 and latch 7, which is secured thereto, are adapted to be partially rotated by means of a rod 7a, which is secured to the shaft 6 at one of its ends in a suitable manner, and to the piston of an air cylinder 7a at its other end.

A suitable and conventional electrical wiring circuit including a pyrometer device, relays, and preferably also push-buttons, is provided for the motors 9 and 23, the magnetic clutch device 15 and the magnetic brake 28 for the motor 23.

The rotation of the motor 9 is automatically compensated for differences in the resistance to metal displacement caused by introducing metal of varying temperatures into the rolls. The operation is such that the variations in temperature of the work-piece being processed, as measured by photoelectric, optical, radiation pyrometer, or other heat responsive device, will be transmitted to the motor 9 in such manner as to increase or retard the rotation thereof, thereby varying the rate of withdrawal of the mandrel bar carriage 3. This is for the reason that, as the mandrel bar carriage 3 is withdrawn the plug B on the end of the mandrel bar 4 will move away from the metal working rolls A and thus allow the wall thickness of the work-piece X to increase with no accompanying increase in its external diameter. The modification in the rate of withdrawal, which is effected by the heat responsive device thus compensates for differences in resistance to metal displacement caused by temperature variations. That is to say, the withdrawal is accelerated if the work-piece is highly heated, as it responds more readily to displacement and does not require a more severe processing action which would be necessitated if it were less highly heated. Thus, varying temperature conditions in successive areas of a single work-piece will not affect the final result.

In operation, upon the entry of the work-piece X into the rolls A of the mill, the motor 9, magnetic clutch 15 and magnetic brake 28 are energized through the load relays, or suitable push-buttons described. As before stated, the rate at which the motor operates is controlled through suitable resistance, modified by the action of the heat responsive device. The motion transmitted by the motor 9, gear reduction 11 and shaft 16, through the magnetic clutch 15, is transmitted to the worm 17, coupling 18 and, by means of the shaft 19, the worm 20. The worms 17 and 20 will rotate the worm gears 24 and 26, and their respective sleeves 24a and 26a. This action will cause the screws 25 and 27 to draw the links 8 and attached support 5 backward, or away from the mill, and accordingly the same movement of the mandrel bar 4 and the plug B on the other end thereof. A tendency of the plug, mandrel bar and mandrel bar carriage to move backwardly will, of course, be caused by the action of the work-piece in the mill. This motion will be slowly permitted, as determined by the suitable resistance described, until the work-piece has passed through the mill.

The rotation of the shaft 16, which is transmitted to the shaft 19 by means of the coupling 18, will cause the shaft 23a of the motor 23 to rotate idly, when the motor 9 is energized to withdraw the mandrel bar carriage.

After the work-piece has passed through the mill, the mandrel bar carriage and attached mandrel bar must be quickly returned in order to position the mandrel plug in its initial position in the mill, before the next tube or work-piece is introduced into the rolls.

The operator attending the device, or a suitable relay, momentarily energizes the magnetic brake 28 for the motor 23. This operation at the same time instantaneously deenergizes the magnetic clutch 16 and disengages the motor 9. The motor 23 is then actuated to reverse the direction of rotation of the worms 20 and 17 to rapidly return the support 5 to position preparatory to rolling the next work-piece. At the proper and predetermined position, the action of the motor 23 is arrested by a suitable limit switch, which also applies the brake 28 for the motor 23.

As before stated, the motor 23 will rotate when the action of the motor 9 withdraws the mandrel bar carriage but, upon the return stroke of the carriage, when the motor 23 is energized, the magnetic clutch 15 is deenergized, preventing rotation of the gear reduction, generally indicated at 11, and the motor 9.

Referring to Figures 4 and 5 of the drawings, I have disclosed in a diagram one form of electrical control which will function to operate the elements of the invention in the manner previously described. In this diagram the numerals 30 and 31 designate suitable power lines carrying normal voltage; such as 220 volts.

In order to satisfactorily control the operation of the motor 9, a wire 33 is connected between the power lines 30 and 31, and includes a starting switch 34 and a coil 35. A line 36 connects the line 33, between the power line 31 and the starting switch 34, to the line 33, between the starting switch 34 and the coil 35.

This line 36 includes a manually operable stopping switch 38 and a pair of contacts 35a which are operated by the coil 35. A line 39 connects the line 36, between the contacts 35a and the line 33, with the line 33, between the coil 35 and the power line 31. This line includes a coil 40 and a pair of contacts 35b, the latter also being operated by the coil 35. A line 41 is connected to the line 36, between the contacts 35a and the line 33, and to the line 39 between the coil 40 and the contacts 35b. This line 41 has included in its circuit a pair of coils 42 and 43 and an auxiliary magnetic switch 44.

The motor 9 is connected between the power lines 30 and 31 by a line 46 which includes two pairs of contacts, as at 42ª and 43ª, which are operated by the coils 42 and 43, respectively. This line 46 also includes a pair of contacts 40ª between the power lines 30 and the motor 9, and a pair of contacts 40ᵇ between the contacts 42ª and 43ª and the power line 31. The contacts 40ª and 40ᵇ are operated by the coil 40, and likewise the auxiliary contacts 44.

The photoelectric pyrometer device, which is generally indicated at X, is connected by a line 48 with a series of relays 49, 50, 51, 52, 53 and 54. These relays form a part of a field rheostat 55 which effects an automatic speed adjustment for the motor 9. Each of these relays is adjusted to trip at a definite temperature. This field rheostat 55 is connected between the power lines 30 and 31 by a line 56. This line 56 has included therein, between the power line 30 and the field rheostat 55, the shunt field for the motor 9, which is designated at 9ª, and a hand-operated rheostat 57.

Referring to Figure 5 of the drawings, it is to be noted that the motor for rotating the metal working rolls A is diagrammatically shown at 58, being connected by a line 59 between suitable power lines 60 and 61. While one motor 58 is illustrated in the drawings and may be employed to drive both of the metal working rolls through the medium of suitable gearing (not shown), the invention also contemplates the driving of each roll with an individual motor. The motor 58 is continuously driven as long as the mill is operating. The power lines 60 and 61 supply the motor 58 with current of a considerably higher voltage than that furnished through the power lines 30 and 31; as, for instance, 600 volts. A shunt 65 is included in the line 59 between the power line 60 and the motor 58. A pair of lines 66 and 67 connect the shunt 65 with a load relay 68. The magnetic clutch 15 which is carried on the shaft 16 is connected between the power lines 30 and 31 by a line 70, which has included therein two pairs of contacts, as at 68ª and 68ᵇ, one on either side of the magnetic clutch. The magnetic brake 28 is connected by a line 71 with the power lines 30 and 31 and includes in its circuit two pairs of contacts, as at 85ª and 85ᵇ. A line 73 is connected to the line 70 between the power line 30, and the contacts 68ª, and to the line 71 between the contacts 85ª and the magnetic brake 28. This line 73 includes a pair of contacts 68ᶜ. A similar line 74 is connected to the line 70 between the power line 31 and the contacts 68ᵇ, and to the line 71 between the contacts 85ᵇ and the magnetic brake 28. This line 74 carries a pair of contacts 68ᵈ.

In order to satisfactorily control the operation of the motor 23 which functions to rapidly return the mandrel bar carriage to its initial position, a line 77 is connected between the power lines 30 and 31 and has included therein a starting switch 78, a limit switch 79 and a coil 80. A line 81 connects the line 77, between the power line 30 and the starting switch 78 with the line 77 between the starting switch 78 and the limit switch 79. This line 81 includes a stopping switch 83, and a pair of contacts 80ª, the latter being operated by the coil 80.

A line 84 connects the line 81 between the contacts 80ª and limit switch 79 with the line 77 between the coil 80 and the power line 31. The line 84 has included in its circuit a pair of coils 85 and a pair of contacts 80ᵇ, the latter being operated by the coil 80. A line 87 is connected to the line 81 between the contacts 88 and the limit switch 79, and to the line 84 between the coils 85 and the contacts 80ᵇ. This line 87 includes in its circuit a pair of coils 88, 89 and an auxiliary switch 85ᵉ, the latter being operated by the coils 85. The coils 85 of the line 84, in addition to operating the auxiliary magnetic switch 85ᵉ, also operate the contacts 85ª and 85ᵇ in the line 71.

The motor 23 is connected between the power lines 30 and 31 by a line 90 which has included therein a pair of contacts 88ª and 89ª which are operated by the coils 88 and 89, respectively, of the line 87. A pair of contacts are disposed in the line 90 between the motor 22 and the power line 30 as indicated at 85ᶜ; while a similar pair of contacts 85ᵈ are disposed in the line 90 between the power line 31 and the contacts 88ª and 89ª.

A line 91 is connected between the power lines 30 and 31 and includes the shunt field for the motor 23, which is designated at 23ª, and a hand-operated rheostat 93. The energization of the load relay 68 closes the contacts 68ª and 68ᵇ in the line 70, and the contacts 68ᶜ and 68ᵈ in the lines 73 and 74, respectively. The limit switch 79 is arranged in such manner as to be opened by the movement of the mandrel bar carriage 3 to its original position in the mill, prior to the processing of a work-piece.

In operation: The operator of the mill closes the starting switch 34 for the motor 9, thus energizing the coil 35 (which is maintained by its contacts 35ª), thus closing the contacts 35ª and 35ᵇ and energizing the coil 40 to close the contacts 40ª and 40ᵇ. The closing of these contacts and the contacts of the auxiliary switch 44, which they effect, starts the motor 9 which will attain a speed of rotation which is predetermined by the setting of the hand-operated rheostat 57. The closing of the contacts of the auxiliary switch 44 energizes the coils 42 and 43, thus closing the contacts 42ª and 43ª.

As the work-piece enters the mill, the power required by the motor 58 in driving the metal working rolls A passes through the shunt 65. This causes a "voltage drop" across the shunt, and energizes the load relay 68, which causes the closing of the contacts 68ª, 68ᵇ, 68ᶜ and 68ᵈ. The closing of these contacts energizes the magnetic clutch 15, and the magnetic brake 28. The accompanying coupling of the clutch and the release of the brake mechanically connects the motor 9, which is running, as previously mentioned. The motor 9 withdraws the mandrel bar carriage 3 of the mill at a speed which is predetermined by the setting of the hand-operated rheostat 57. This, as previously mentioned, produces an increase in the wall thickness of the work-piece. The setting of the hand-operated rheostat is such that the mandrel B will be slowly but constantly withdrawn from between the metal-working rolls A which, if the work-piece X were cold, would be sufficient to constantly decrease the internal diameter (and accordingly increase the wall-thickness) of the work-piece. Due to the temporary rise in temperature of the metal-working elements of the mill and the corresponding expansion of the mandrel bar 4, and to a slight extent the mandrel B and rolls A, the rate of withdrawal of the mandrel B must be accelerated to a rate beyond that required if the work-piece were cold. This acceleration is accomplished by the relays 49 through 54, each of which is adjusted to trip at a definite temperature.

The photoelectric pyrometer device, which is generally designated at Z, is set for a predetermined temperature indication, and if the temperature of the work-piece, as it passes the point upon which it is "trained", is either above or below this indication, the relays 49 through 54, inclusive, are individually and progressively excited and caused to function. The functioning of these relays will include, or delete, sections of the field rheostat 55 to increase, or decrease, the speed of operation of the motor 9. It will thus be seen that the rate of withdrawal of the mandrel bar carriage 3 is in direct proportion to the temperature of the work-piece being processed in the mill. That is to say, the pass will be constantly enlarged regardless of variations resulting from expansion which is, in turn, due to temperature changes.

The power required by the motor, or motors, 58 which drives the metal working rolls of the mill will approach zero after the trailing end of the work-piece has emerged therefrom. This causes the "voltage drop" across the shunt 65 to approach zero and, in consequence thereof, the deenergization of the load relay 68. The deenergization of this load relay opens the contacts 68ª, 68ᵇ, 68ᶜ and 68ᵈ, to deenergize the magnetic clutch 15 and the magnetic brake 28. This last operation uncouples the clutch and applies the brake to stop the motor 9.

After the operator has removed the work-piece from the mill from the usual discharge trough (not shown) and returns the mandrel bar to its initial position, he operates the starting switch 78 for the motor 23. The operation of the starting switch 78 for the motor 23 energizes the coil 80 (which is maintained by one of its contacts 80ª), and closes the contacts 80ª and 80ᵇ; thus energizing the coils 85. The energization of the coils 85 closes the contacts 85ª, 85ᵇ, 85ᶜ and 85ᵈ and the contacts of the auxiliary switch 85ᵉ to energize and release the magnetic brake 28 and start the motor 23.

The speed attained by the motor is predetermined by the setting of the hand-operated rheostat 93, after the closing of the contacts of the auxiliary switch 85ᵉ. The closing of the auxiliary switch 85ᵉ energizes the coils 88 and 89, which close the contacts 88ª and 89ª.

The motor 23 will operate to return the mandrel bar carriage 3 to its original position in the mill, which is predetermined by the location of the limit switch 79, the latter opening when this position is reached. The opening of this limit switch deenergizes the coil 80, thus opening the contacts 80ª and 80ᵇ, thereby stopping the operation of the motor 23 and effecting the application of the magnetic brake 28, all by the opening of the various contacts 85ª, 85ᵇ, 85ᶜ and 85ᵈ, and the contacts of the auxiliary switch 85ᵉ, which is caused by the deenergization of the coils 85.

The equipment is now ready for another cycle of operation, which is effected by the entry of a second work-piece between the rolls of the mill which are driven by the motor 58. This effects a second "voltage drop" across the shunt 65, which energizes the load relay 68, thus repeating the operation previously described.

While I have shown and described certain specific embodiments of my invention, it will be understood that I do not wish to be limited exactly thereto, since various modifications may be made without departing from the scope of my invention, as defined by the following claims.

I claim:

1. Apparatus for making tapered tubular work-pieces comprising, in combination, at least one power actuated metal working roll, a roll for coacting with said first named roll, a mandrel plug disposed intermediate said rolls, means for withdrawing said mandrel plug to increase the distance between the surfaces of said mandrel plug and said rolls while a work-piece is being acted upon thereby, means responsive to the temperature of said work-piece for modifying the speed of operation of said withdrawing means, said withdrawing means and said last named means being constructed and cooperatively arranged to increase the distance between the surfaces of said mandrel plug and said rolls while said pipe or tube is being acted upon thereby, and means for returning the withdrawn mandrel plug to its initial position.

2. Apparatus for making tubular work-pieces comprising, in combination, at least one power actuated metal working roll, a roll for coacting with said first named roll, a mandrel bar, a mandrel plug supported by said mandrel bar, said mandrel plug being disposed intermediate said rolls, means for withdrawing said mandrel bar and said mandrel plug to increase the distance between the surfaces of said mandrel plug and said rolls while a work-piece is being acted upon thereby, means responsive to the temperature of said work-piece for modifying the speed of operation of said withdrawing means, said withdrawing means and said last named means being constructed and cooperatively arranged to increase the distance between the surface of said mandrel plug and said rolls while said work-piece is being acted upon thereby, and means for returning the withdrawn mandrel bar and mandrel plug to their initial positions.

STEVENSON FINDLATER.